US008031758B2

(12) United States Patent
Dawson et al.

(10) Patent No.: US 8,031,758 B2
(45) Date of Patent: Oct. 4, 2011

(54) POWERLINE COMMUNICATION (PLC) MODEM EMPLOYING AN ANALOG ELECTROMAGNETIC TRANSDUCER

(75) Inventors: Thomas Patrick Dawson, Escondido, CA (US); Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1443 days.

(21) Appl. No.: 11/376,635

(22) Filed: Mar. 14, 2006

(65) Prior Publication Data

US 2007/0220570 A1 Sep. 20, 2007

(51) Int. Cl.
*H04B 1/38* (2006.01)

(52) U.S. Cl. ............ 375/222; 375/259; 725/79; 725/80; 725/81; 725/111; 340/12.33; 340/12.37; 340/12.38; 340/12.39; 340/13.23; 340/13.27; 340/12.32

(58) Field of Classification Search .................. 375/222, 375/259; 708/111, 80; 725/79–81, 111; 340/12.33, 12.37–12.39, 13.23, 13.27, 12.32; 307/19, 82, 84, 104, 126, 145

See application file for complete search history.

(56) References Cited

U.S. PATENT DOCUMENTS

| 3,899,787 | A  | * | 8/1975  | Czerwinski ................... 343/790 |
|-----------|----|---|---------|----------------------------------------|
| 5,982,276 | A  | * | 11/1999 | Stewart ......................... 455/402 |
| 6,271,767 | B1 | * | 8/2001  | Frye et al. .................. 340/853.2 |
| 6,275,144 | B1 | * | 8/2001  | Rumbaugh .................... 375/259 |
| 6,563,420 | B2 | * | 5/2003  | Brown et al. ................ 455/41.1 |
| 6,867,689 | B2 | * | 3/2005  | Yokoo ............................ 375/222 |
| 6,870,465 | B1 | * | 3/2005  | Song ......................... 340/310.16 |
| 6,885,674 | B2 |   | 4/2005  | Hunt et al. ..................... 370/420 |
| 6,927,734 | B2 | * | 8/2005  | Serban et al. ................. 343/703 |
| 6,979,774 | B2 | * | 12/2005 | Abe et al. ....................... 174/377 |
| 6,980,090 | B2 |   | 12/2005 | Mollenkopf ............. 340/310.01 |
| 7,286,812 | B2 | * | 10/2007 | Manis et al. ................... 455/402 |
| 7,376,349 | B2 | * | 5/2008  | Ionov et al. ..................... 398/47 |
| 7,414,526 | B2 | * | 8/2008  | Zitting et al. ................. 340/538 |
| 7,598,844 | B2 | * | 10/2009 | Corcoran et al. ........ 340/310.11 |
| 7,660,345 | B2 | * | 2/2010  | Yu ................................. 375/222 |
| 2002/0010934 | A1 | * | 1/2002 | Matsuda ......................... 725/64 |
| 2003/0071719 | A1 |   | 4/2003 | Crenshaw et al. ........ 340/310.01 |
| 2004/0009709 | A1 |   | 1/2004 | Ooishi .......................... 439/638 |
| 2004/0130413 | A1 |   | 7/2004 | Mentz et al. .................. 333/167 |

(Continued)

OTHER PUBLICATIONS

Robert Valdes, "How Broadband Over Powerlines Works", downloaded Jan. 4, 2006, http://computer.howstuffworks.com/bpl.htm/printable, 8 pages.

(Continued)

*Primary Examiner* — Dac Ha
*Assistant Examiner* — Rahel Guarino
(74) *Attorney, Agent, or Firm* — Stuart H. Mayer, Esq.; Karin L. Williams, Esq.; Mayer & Williams PC

(57) ABSTRACT

A PLC cable modem is provided which includes an analog electromagnetic field transducer for generating an electromagnetic field based on an analog electrical signal and also for generating an analog electrical signal based on an electromagnetic field. The PLC cable modem also includes an analog signal processing unit operatively coupled to the analog electromagnetic field transducer and a digital signal processing unit for processing signals received from (or to be sent to) the analog signal processing unit. An interface port is provided for communicating digital signals to and from a data transmission or receiving device.

7 Claims, 3 Drawing Sheets

U.S. PATENT DOCUMENTS

| | | | | |
|---|---|---|---|---|
| 2005/0001694 | A1 | 1/2005 | Berkman | 333/100 |
| 2005/0015805 | A1* | 1/2005 | Iwamura | 725/79 |
| 2005/0062589 | A1 | 3/2005 | Cern | 340/310.07 |
| 2005/0113054 | A1 | 5/2005 | Lee | 455/270 |
| 2005/0194909 | A1 | 9/2005 | Ooishi | 363/146 |
| 2005/0207079 | A1 | 9/2005 | Tiller et al. | 361/64 |
| 2005/0253690 | A1 | 11/2005 | Crenshaw et al. | 340/310.17 |
| 2005/0268322 | A1 | 12/2005 | Watson | 725/130 |
| 2005/0286509 | A1 | 12/2005 | Iwamura | 370/381 |
| 2006/0083378 | A1* | 4/2006 | Budde et al. | 380/277 |
| 2006/0251115 | A1* | 11/2006 | Haque et al. | 370/466 |
| 2009/0252200 | A1* | 10/2009 | Dohler et al. | 375/141 |

OTHER PUBLICATIONS

"Homeplug Powerline Alliance—FAQ's", downloaded Jan. 9, 2006, http://www.homeplug.org/en/faq/index.asp, 9 pages.

Anthony Good, "Fequently Asked Questions About Broadband Over Powerline (BPL/PLT)", downloaded Jan. 4, 2006, http://www.qrpis.org/~k3ng/bpl.html, 38 pages.

"HomePlug AV White Paper". Copyright© 2005, HomePlug® Powerline Alliance, Inc., 11 pages.

"Power Line Communication", downloaded Jan. 9, 2006, http://en.wikipedia.org/wiki/Power_line_communication, 7 pages.

"HomePlug 1.0 Technology White Paper", *Homeplug Powerline Alliance*, date unknown, but prior to the filing of the instant application, 9 pages.

Jerry Ramie, Review of FCC Report & Order 04-245 on Broadband Over Power Lines (BPL), Conformity, downloaded Jan. 4, 2006, http://www.conformity.com0508/0508review.html, 13 pages.

"Broadband Over Power Line (BPL) and Amateur Radio", downloaded Jan. 4, 2006, http://www.arrl.org/tis/info/HTML/plc/, 3 pages.

* cited by examiner

POWERLINE COMMUNICATION (PLC) MODEM EMPLOYING AN ANALOG ELECTROMAGNETIC TRANSDUCER

FIELD OF THE INVENTION

The present invention relates generally to Powerline Communication (PLC) networks, and more particularly to a method and apparatus for connecting a device, particularly a battery-powered device, to a PLC network without using an AC connection.

BACKGROUND OF THE INVENTION

The ability to interconnect computers and other intelligent devices is a common requirement wherever people live and work today. The electrical connection required to form this local area network (LAN) has traditionally been accomplished by installing dedicated data wiring both inside buildings and between clusters of buildings. A number of wireless (i.e. radio) methods have also been developed and deployed to address this need.

Well-established power distribution systems exist throughout most of the United States, and other countries, which provide power to customers via power lines. With some modification, the infrastructure of the existing power distribution systems can be used to provide data communication in addition to power delivery, thereby forming a power line communication (PLC) system. This infrastructure can also be used to establish residential or office-based networks using the pre-existing wiring already present on the premises.

PLC, also known as Broadband Power Line (BPL), is a technology that encompasses transmission of data at high frequencies through existing electric power lines, i.e., conductors used for carrying a power current. Power current is typically transmitted through power lines at a frequency in the range of 50-60 hertz (Hz). In low voltage lines, power current is transmitted with a voltage between about 90 to 600 volts, and in medium voltage lines, power current is transmitted with a voltage between about 2,400 volts to 35,000 volts. Power Line Carrier (PLC) technology typically uses modulated radio frequency (RF) signals between about 1 MHz and 30 MHz, which are conducted on the power wiring to transport the data. The voltage of the data signal ranges from a fraction of a volt to a few tens of volts. Data communication can employ various modulation schemes such as amplitude modulation, frequency modulation, pulse modulation or spread spectrum modulation.

There are significant practical advantages offered by PLC technology—namely that electrical wiring, of necessity, must be installed and that data connectivity can therefore be immediately added at little (or no) additional cost, particularly in existing buildings. Similarly, electrical outlets are ubiquitous within modern buildings and significant operating convenience is realized when data is simultaneously available at every outlet. Another advantage of PLC technology is that the range that can be achieved is significantly greater than wireless methods, particularly in commercial buildings constructed of heavier materials that severely attenuate wireless signals.

Techniques for home networking over residential, low voltage, power lines have received considerable attention in recent years. The HomePlug Powerline Alliance, for example, has established a high-speed PLC networking standard that operates at RF frequencies between about 1 and 30 MHz. Currently, several manufacturers such as Intellon and Conexant are producing and marketing PLC devices for the consumer market that are interoperable under HomePlug standards. HomePlug is developing a new specification, HomePlug A/V, which will operate upward in frequency to somewhere near 30 MHz. The transmission technique employed by HomePlug 1.0 and HomePlug A/V (HPAV) is Orthogonal Frequency Division Multiplexing (OFDM).

A device that is to communicate over a PLC network such as a personal computer, media server, and the like, plugs into a conventional AC outlet to establish a communication path. While this can be a convenient arrangement for many such devices, it is inconvenient when the device to be networked does not use AC power as its primary energy source but rather is powered by a battery or other DC source. For instance, many portable MP3 players, digital cameras, and PDAs use a battery (rechargeable as well as non-rechargable) as their primary energy source and thus do not have an appropriate AC connector (except of course possibly an AC connector that is used to recharge the battery).

High voltage power lines are also used in PLC networks for communication purposes. While generally it is not practical to directly connect a communication device to high power conductors, in some cases it may be necessary. For instance, a technician servicing a problem with data transmission over a high power line may need to monitor the PLC network at various points along it without affecting the existing connections on the power lines. In this case, the technician will be observing activity on the network rather than establishing a two-way connection.

Accordingly, it would be desirable to provide for both residential, business and other purposes a method and apparatus for connecting a device, particularly a battery-powered device, to a PLC network without using an AC connection.

SUMMARY OF THE INVENTION

In accordance with the present invention, a PLC cable modem is provided. The PLC modem includes an analog electromagnetic field transducer for generating an electromagnetic field based on an analog electrical signal and also for generating an analog electrical signal based on an electromagnetic field. The PLC cable modem also includes an analog signal processing unit operatively coupled to the analog electromagnetic field transducer and a digital signal processing unit for processing signals received from (or to be sent to) the analog signal processing unit. An interface port is provided for communicating digital signals to and from a data transmission or receiving device.

In accordance with one aspect of the invention, the interface port comprises a USB port.

In accordance with another aspect of the invention the interface port comprises an Ethernet port.

In accordance with another aspect of the invention, the interface port comprises a 100 Base-T connector.

In accordance with another aspect of the invention, the analog and digital signal processing units are HomePlug compliant.

In accordance with another aspect of the invention, the analog electromagnetic field transducer comprises one or more antennas.

In accordance with another aspect of the invention, the analog electromagnetic field transducer comprises a reception antenna and a transmission antenna.

In accordance with another aspect of the invention, a method is provided for receiving data from a PLC network. The method begins by detecting an electromagnetic field generated by the PLC network and transforming changes in the electromagnetic field that correspond to data into an electrical output signal. The method continues by transforming the electrical output signal into a digital signal and communicating the digital signal to a data receiving device.

In accordance with another aspect of the invention, the data receiving device is a battery-powered device.

In accordance with another aspect of the invention, the data receiving device is selected from the group consisting of a network monitor, portable digital audio player, digital camera, and PDA.

In accordance with another aspect of the invention, a method is provided for transmitting data over a PLC network. The method begins by receiving from a data transmitting device a digital signal in which information is embodied. The method continues by generating an electromagnetic field that is modulated to incorporate the information embodied in the digital signal and transmitting the electromagnetic field to the PLC network.

DETAILED DESCRIPTION

For purposes of this document, the term "power line communication network" is intended to embrace any network that utilizes electrical power lines within a home, office or other structure as the communication medium used for network communication between connected devices. In particular, this term is used to encompass networks designed to use the HomePlug network standards, current and future, which utilize a time slotted form of Orthogonal Frequency Division Multiplexing (OFDM) as the multiplexing mechanism to provide communications over the power line medium within the 1 to 30 MHz frequency band. Of course, the present invention, is equally applicable to networks that employ other power line communication standards, such as those currently being developed by a number of different organizations, including IEEE P1901, OPERA (Open PLC European Research Alliance), UPA (Universal Powerline Association, and the CEPCA (Consumer Electronics Powerline Communication Alliance).

As discussed in more detail below, a method and apparatus is provided for establishing two-way communication over a PLC network that operates at low or medium voltages. The method and apparatus can also be used to establish one-way communication for the purposes of monitoring signal quality and transmission parameters of a PLC network (or a portion thereof) that employs high voltage power lines.

Figure 1:
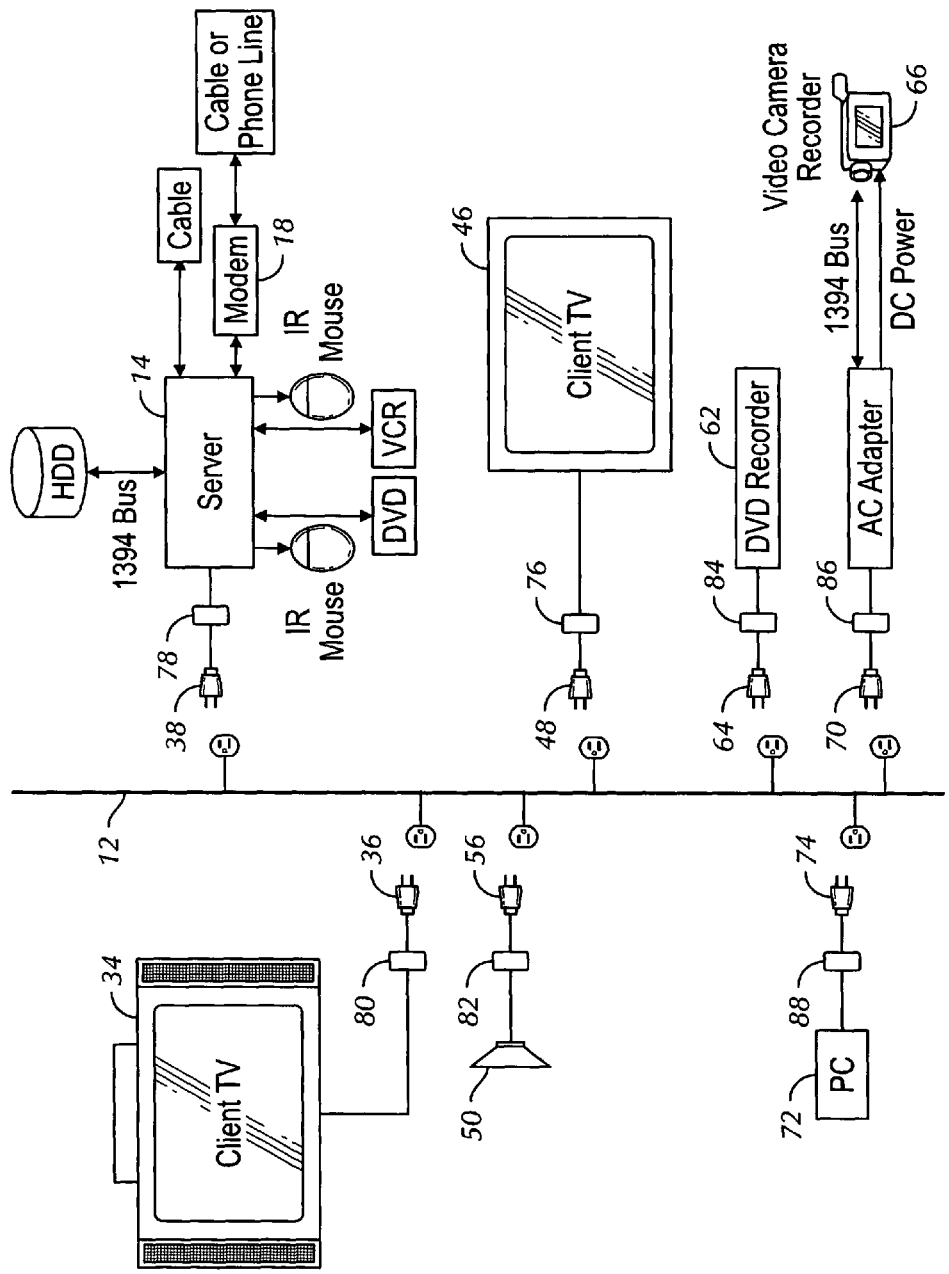
FIG. 1 shows an example of a power line communication (PLC) network and a variety of networked devices that may be in communication over the network PLC network.

FIG. 1 shows an example of a power line communication (PLC) network 12 and a variety of networked devices that may be in communication over the network. PLC network 12 may be of the type providing connectivity between the AC power outlets located within the rooms of a residential dwelling. The networked devices in this example include a server 14, televisions 34 and 46, loudspeaker 50 a video recording device such as a DVD recorder 62, video camera 66 and personal computer (PC) 72. Of course, the networked devices in the figure are shown for purposes of illustration only and it should be appreciated that more or fewer devices may be connected to PLC network 12. Moreover, the variety of devices is not limited to those depicted in FIG. 1 but more generally may be any device cable of supplying data for transmission (or for receiving such data) including, without limitation, a telephone, a telephone answering machine, a fax, a printer, a digital cable box (e.g., for processing digital audio and video game unit, which may then be supplied to a conventional television and for transmitting requests for video programming), a video game, a stereo, a videophone, a television (which may be a digital television), a computer, a video recording device, a home network device, and a utility meter.

Each of the networked devices is connected to the PLC network 12 via a power line interface device, which is sometimes referred to as a PLC modem. For instance, server 14, television 34, loudspeaker 50, DVD recorder 62, video camera 66, PC 72 and television 46 are connected to the PLC network via PLC modems 78, 80, 82, 84, 86, 88 and 76 respectively. The PLC modems serve as the data interface between the networked devices and the PLC network 12. As shown, each PLC modem has an AC connector or plug that is inserted into a power outlet to digitally connect the networked devices to communicate data signals carried by the PLC network 12. For instance, in FIG. 1, PLC modems 78, 80, 82, 84, 86, 88 and 76 include AC connectors 38, 36, 56, 64, 70, 74, and 48 respectively.

The connection between each networked device and the respective PLC modem exists for communication purposes only. Thus, if a networked device also requires power from the PLC network 12 there must exist a second connection from the host PLC modem to the power-line 12 for the purpose of providing electrical power to the networked device. In some cases, such as shown in U.S. Patent Appl. Serial No. 2005/0194909, for example, the same connector may be used to supply power to establish the data connection.

In FIG. 1 the PLC modems are shown as devices that are located external to the networked devices with which they are respectively associated. In other cases the PLC modem is an integrated device that is incorporated directly into a networked device. If the PLC modem is an external device, it may include one or more standard interfaces that allow it to be connected to the corresponding standard interface employed by different networked devices. For instance, the PLC modem can include a RJ-11 Plain Old Telephone Service (POTS) connector, an RS-232 connector, a USB connector, a 10/100 Base-T connector, RJ-45 connector, and the like. In this manner, a variety of networked devices can be connected to the PLC network.

Server 14 may receive data such as Internet data or video content over a PLC access network or, as shown, from a conventional cable connection 18 such as a television cable connection, satellite feed, broadcasting antenna, and so forth. Additionally, or alternatively, the server 14 may receive data from a conventional modem 18 such as a cable modem, ADSL telephone line modem, wired network, wireless network, and so forth.

Since power lines, whether used for medium voltage transmission or low voltage transmission within a residence or other premises, are not shielded, the current conducted on the power line will generate a significant electromagnetic field. Since the current is modulated by the data signal (as well as by the AC power) that is superimposed on it, the electromagnetic field will be similarly modulated. That is, the data is impressed on the electromagnetic field. In accordance with the present invention, this electromagnetic field can be received by an electromagnetic field coupling device. If the coupling device is incorporated into a power line interface device—a PLC modem—then a wireless communication path can be established from the PLC network 12 to a battery-powered networked device that does not employ an AC connector. The electromagnetic field coupling device operates as an analog electromagnetic field transducer in which an output signal is generated that is proportional to the electromagnetic field strength, and visa versa. That is, the analog electromagnetic field transducer can be used to "receive" data from the PLC network 12. In addition to detecting electromagnetic fields, the electromagnetic field transducer also generates electromagnetic fields based on signals provided by the PLC modem, which in turn will be received by the PLC network 12 to establish a wireless communication path from the battery-powered device to the PLC network. That is, the analog electromagnetic field transducer can also be used to "transmit" data to the PLC network 12. Thus, properly configured, a PLC modem integrated with an analog electromagnetic field transducer eliminates the need for an AC connector that plugs into the PLC network 12.

For the purpose of "receiving" data from a PLC network, a conventional antenna coil (such as the type used to monitor line noise) can be used. While in some cases this same antenna coil may also be used for transmitting data to the PLC network, in other cases it may be advantageous to employ a separate antenna for transmission purposes. The use of two antennas can overcome inductance problems that could arise when a single antenna is used since in such a case the power needed for a "transmission" operation would need to "die out" before a reception operation could be performed. The necessary time interval may not be fast enough to support some communication protocols, depending on how the signal is carried on the AC line, thus necessitating two antennas.

If two antennas are employed, the reception antenna may be configured so that it is always in a reception mode of operation. Thus, when the transmission antenna is used the data that it generates will also be received by the reception antenna. This data may be ignored, or it could be used to gauge the quality of the connection to the PLC network by comparing the signal strength of the signal from the transmission antenna to another connection on the PLC network.

Figure 2:
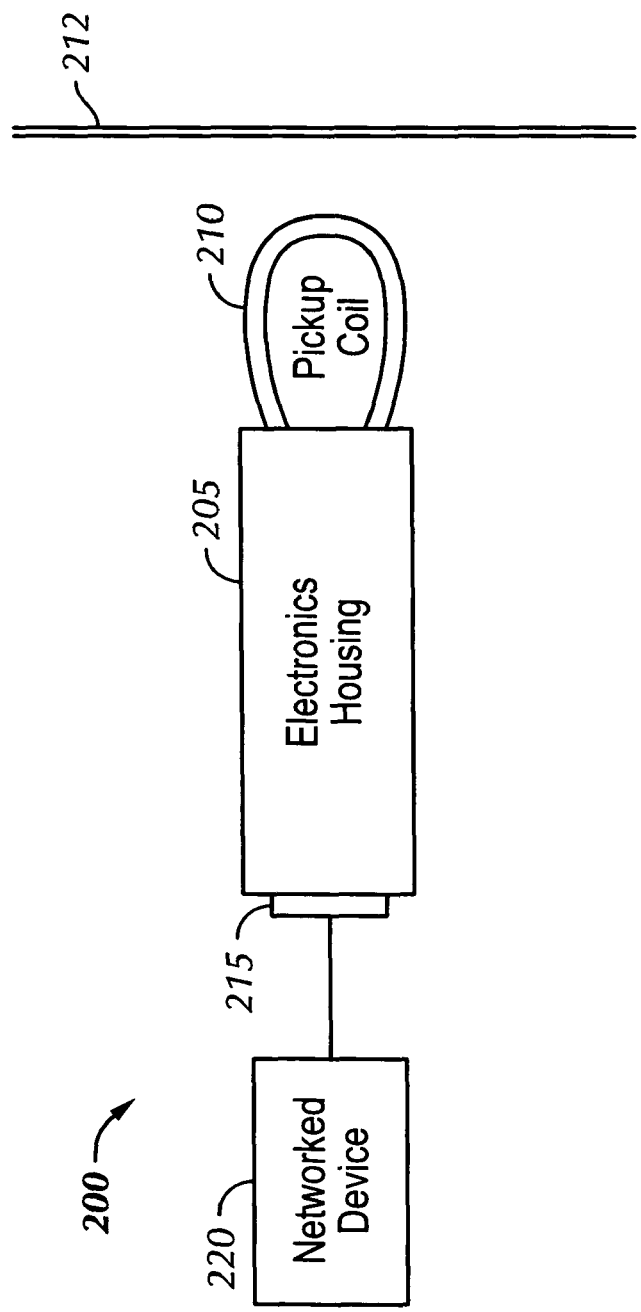
FIG. 2 shows an example of a PLC modem constructed in accordance with the present invention.

FIG. 2 shows an example of a PLC modem 200 constructed in accordance with the present invention. The PLC modem 200 includes an analog electromagnetic field transducer 210 (e.g., one or more pickup coils or antennas) that detects electromagnetic fields from the PLC network 212 on which data is impressed and converts them into output signals that are processed by the remaining components of the PLC modem. For simplicity of illustration only, a single pickup coil is shown in FIG. 2. Of course, as previously mentioned, in some cases separate antennas may be provided for reception and transmission purposes. The transducer 210 also includes an electronics housing 205 that includes the various signal processing components such as A/D and D/A converters, which are discussed in more detail below. As further shown in FIG. 2, the PLC modem 200 also includes a device interface 215 such as an Ethernet port, USP port, an RJ-11 connector, an RS-232 connector, a USB connector, a 10/100 Base-T connector, an RJ-45 connector, or the like to connect a networked device 220 to the wireless PLC modem 200.

The analog electromagnetic field transducer may simply include a pickup coil or antenna and an analog front end (AFE) section that implements various transmit or receive filter functions and gain stages. For instance, the AFE may include a filter that has a frequency band to pass the carrier frequency of the data signals and thus remove any noise that might be present. The output of the AFE is supplied to the remaining components that constitute a PLC modem. The PLC modem may include one or more additional functional sub-modules such as an Analog-to-Digital Converter (ADC), Digital-to-Analog Converter (DAC), a memory, source encoder/decoder, error encoder/decoder, channel encoder/decoder, MAC (Media Access Control) controller, encryption module, and decryption module. These functional sub-modules may be omitted in some embodiments, may be integrated into a modem integrated circuit (chip or chip set), or may be peripheral to a modem chip.

Figure 3:
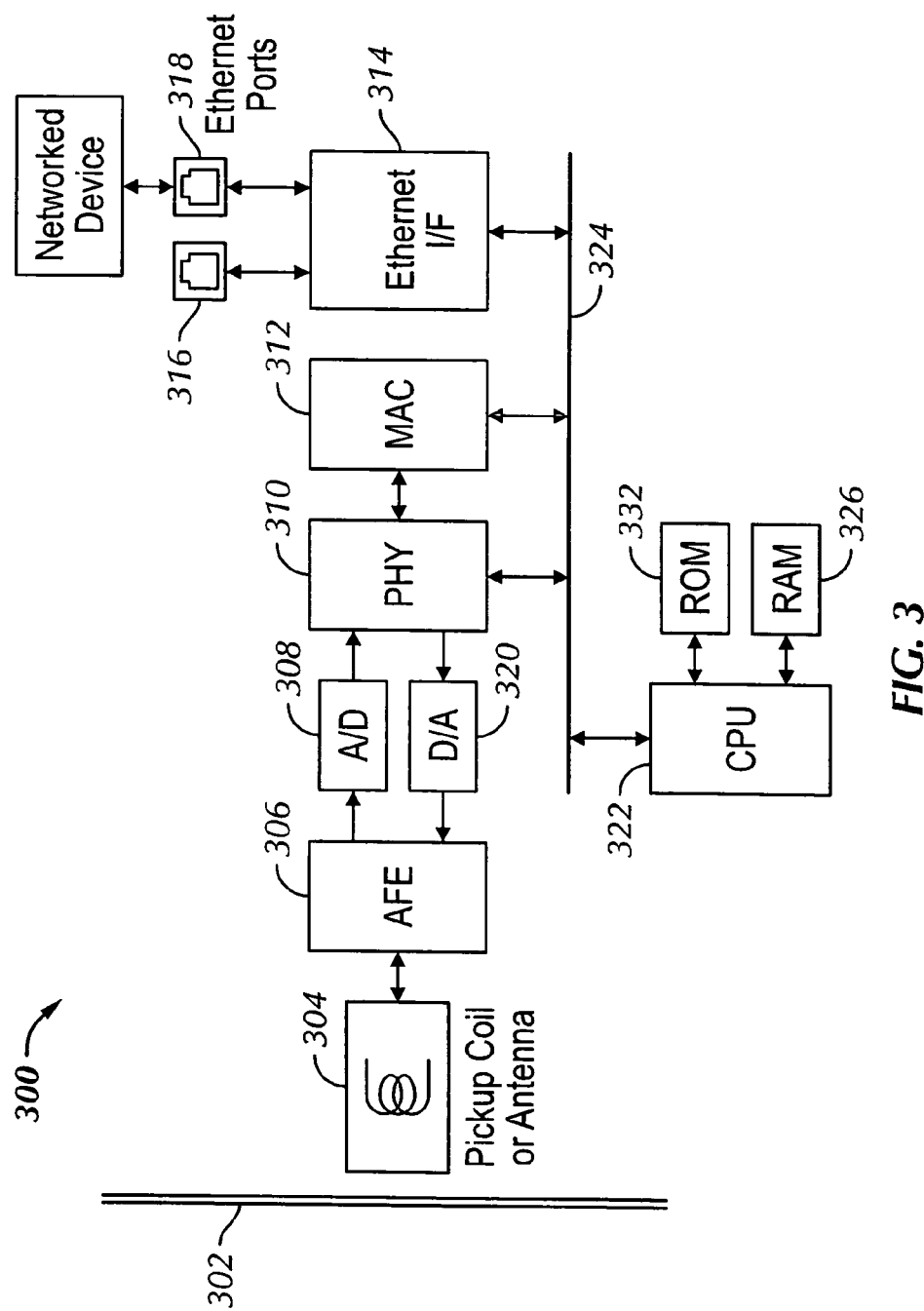
FIG. 3 shows a functional block diagram of one particular embodiment of a PLC modem constructed in accordance with the present invention.

FIG. 3 shows a functional block diagram of one particular embodiment of a PLC modem 300 constructed in accordance with the present invention. An electromagnetic field from the PLC network 302 is received by the pickup coil or antenna 304 and sent to AFE 306, which filters and amplifies the analog signal. The analog output from the AFE 306 is directed to analog-to-digital (A/D) converter 308. The digital signal is processed by the physical layer (PHY) unit 310 and media access control layer (MAC) unit 312. The MAC unit 312 controls the sharing of the medium among multiple clients, while the PHY unit 310 specifies the modulation, coding, and basic packet formats. The signal from the MAC unit 312 is directed to a networked device interface, which in this example is an Ethernet interface 314, which in turn forwards the signal to one of the Ethernet ports 316 or 318. Instead, or in addition to the Ethernet port or ports, other networked device interfaces that may be provided include a USB port, a PCI port, or any other appropriate port or connector such as those previously mentioned.

When a data signal to be sent from a networked device to the PLC network 302, the signal processing process is reversed. The data from the networked device is received by one of the Ethernet ports 316 or 318 and forwarded to MAC unit 312 via the Ethernet interface 314. The signal is processed by the MAC unit 312 and PHY unit 310. The resulting digital signal is converted to an analog signal by D/A converter 320, forwarded to the AFE 306 and the antenna 304. Finally, the antenna 304 generates an electromagnetic field that is received by and coupled onto the PLC network 302.

The PLC modem 300 also includes a processor 322 that controls the PHY and MAC units 310 and 312 via an internal bus 324, which may be, for example, a PCI bus. The processor 322 executes programs stored in ROM 332. A RAM 326 is provided for temporary storage by the processor 322.

If the PLC modem 300 is HomePlug compliant, the PHY unit 310 employs Orthogonal Frequency Division Multiplexing (OFDM) and CDMA/CA (Code Division Multiple Access with Collision Avoidance). The PHY unit 310 provides additional signal processing to improve the effective signal-to-noise ratio, and provide robustness in the presence of significant impulse noise. That is, each device enables its transmitter only when it has data to send and, upon finishing, turns off its transmitter and returns to a reception mode. In the HomePlug standard, the PHY layer includes a frame structure that has logically separate frame control and frame data blocks, and separate forward error correction encoding for each. The MAC unit 312 is compatible with IEEE 802.3 frame formats, which simplifies integration with an Ethernet interface. The MAC unit 312 appends Ethernet frames with encryption and other management before transmitting it to the PLC network 302. A segmentation and reassembly mechanism is used in cases where the complete package cannot be fit into a single frame. Of course, as previously mentioned, the modem of the present invention may be compatible with any appropriate PLC network standard and is not limited to the HomePlug protocols.

In some embodiments, the PLC modem may be employed in a wide variety of different battery-operated portable devices, such as Walkman™ or other portable audio player, a laptop, a PSP and the like. If the device is configured for use with an AC power cable, the pickup coil or antenna is not required.

The invention claimed is:

1. A PLC cable modem, comprising:
 an analog electromagnetic field transducer for
  generating a first electromagnetic field based on an analog electrical signal provided by the PLC cable modem, and for
  generating an analog electrical signal based on a second electromagnetic field detected by said transducer, said second electromagnetic field generated by current, modulated by a data signal, conducted on a power line;
 an analog signal processing unit operatively coupled to the analog electromagnetic field transducer;
 a digital signal processing unit for processing signals received from or to be sent to the analog signal processing unit; and
 an interface port for communicating digital signals to and from a data transmission or receiving device.

2. The PLC cable modem of claim 1 wherein the interface port comprises a USB port.

3. The PLC cable modem of claim 1 wherein the interface port comprises an Ethernet port.

4. The PLC cable modem of claim 1 wherein the interface port comprises a 10 or 100 Base-T connector.

5. The PLC cable modem of claim 1 wherein the analog and digital signal processing units are HomePlug compliant.

6. The PLC cable modem of claim 1 wherein the analog electromagnetic field transducer comprises one or more antennas.

7. The PLC cable modem of claim 1 wherein the analog electromagnetic field transducer comprises a reception antenna and a transmission antenna.

* * * * *